US011100411B2

(12) United States Patent
Lawrence et al.

(10) Patent No.: US 11,100,411 B2
(45) Date of Patent: Aug. 24, 2021

(54) PREDICTING INFLUENCE IN SOCIAL NETWORKS

(71) Applicant: International Business Machines Corporation, Armonk, NY (US)

(72) Inventors: Richard D. Lawrence, Ridgefield, CT (US); Estepan Meliksetian, Yorktown Heights, NY (US); Prem Melville, White Plains, NY (US); Claudia Perlich, Mount Kisco, NY (US); Karthik Subbian, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 15/605,380

(22) Filed: May 25, 2017

(65) Prior Publication Data

US 2017/0262759 A1    Sep. 14, 2017

Related U.S. Application Data

(63) Continuation of application No. 14/706,316, filed on May 7, 2015, now Pat. No. 9,684,868, which is a (Continued)

(51) Int. Cl.
*G06Q 30/02*        (2012.01)
*G06F 16/33*        (2019.01)
(Continued)

(52) U.S. Cl.
CPC .............. *G06N 5/04* (2013.01); *G06N 20/00* (2019.01); *G06Q 10/10* (2013.01); *G06Q 30/0201* (2013.01); *G06Q 50/01* (2013.01)

(58) Field of Classification Search
CPC .......... G06N 5/04; G06N 20/00; G06N 5/022; G06Q 30/0201; G06Q 50/01; G06Q 10/10
(Continued)

(56) References Cited

U.S. PATENT DOCUMENTS

| 7,937,336 B1 * | 5/2011 | Maynard-Zhang | ..... H04L 67/18 706/12 |
| 2002/0062368 A1 | 5/2002 | Holtzman et al. | |

(Continued)

OTHER PUBLICATIONS

Adamic et al., "How to search a social network," Social Networks 27 (2005) pp. 187-203.
(Continued)

*Primary Examiner* — Brandon S Cole
(74) *Attorney, Agent, or Firm* — Scully, Scott, Murphy & Presser, P.C.; Daniel P. Morris

(57) ABSTRACT

A method, system and computer program product are disclosed for predicting influence in a social network. In one embodiment, the method comprises identifying a set of users of the social network, and identifying a subset of the users as influential users based on defined criteria. A multitude of measures are identified as predictors of which ones of the set of users are the influential users. These measures are aggregated, and a composite predictor model is formed based on this aggregation. This composite predictor model is used to predict which ones of the set of users will have a specified influence in the social network in the future. In one embodiment, the specified influence is based on messages sent from the users, and for example, may be based on the number of the messages sent from each user that are re-sent by other users.

18 Claims, 6 Drawing Sheets

FOLLOWER GRAPH

RETWEET GRAPH

MENTION GRAPH

Related U.S. Application Data continuation of application No. 13/206,981, filed on Aug. 10, 2011, now Pat. No. 9,031,888.

(51) Int. Cl.
*G06F 16/38* (2019.01)
*G06Q 30/00* (2012.01)
*G06N 5/04* (2006.01)
*G06N 20/00* (2019.01)
*G06Q 50/00* (2012.01)
*G06Q 10/10* (2012.01)

(58) Field of Classification Search
USPC ........................................ 706/1–62
See application file for complete search history.

(56) References Cited

U.S. PATENT DOCUMENTS

| | | | |
|---|---|---|---|
| 2006/0143081 | A1 | 6/2006 | Argaiz |
| 2009/0048904 | A1 | 2/2009 | Newton et al. |
| 2009/0164624 | A1 | 6/2009 | Metcalf et al. |
| 2009/0222329 | A1 | 9/2009 | Ramer et al. |
| 2010/0076850 | A1 | 3/2010 | Parekh et al. |
| 2010/0191686 | A1 | 7/2010 | Wang et al. |
| 2010/0228692 | A1* | 9/2010 | Guralnik .................. G06K 9/72 706/12 |
| 2010/0241580 | A1 | 9/2010 | Schleier-Smith |
| 2011/0066613 | A1 | 3/2011 | Berkman et al. |
| 2011/0313988 | A1* | 12/2011 | Ghosh ................... G06F 16/334 707/706 |
| 2011/0320250 | A1* | 12/2011 | Gemmell ........... G06Q 30/0214 705/14.16 |
| 2012/0123867 | A1* | 5/2012 | Hannan .............. G06Q 30/0261 705/14.58 |
| 2013/0018968 | A1* | 1/2013 | Pennacchiotti .... G06Q 30/0201 709/206 |

OTHER PUBLICATIONS

Anagnostopoulos et al., "Influence and Correlation in Social Networks," KDD'08, Aug. 24-27, 2008, Las Vegas, Nevada, USA.
Domingos et al., "Mining the Network Value of Customers," KDD 2001, San Francisco, CA,. USA.
Dwork et al., "Rank Aggregation Methods for the Web," WWW10, May 1-5, 2001, Hong Kong.
Kempe et al., "Maximizing the Spread of Influence through a Social Network," SIGKDD 2003 Washington DC, USA.
Melville et al., "Sentiment Analysis of Blogs by Combining Lexical Knowledge with Text Classification," KDD'09, Jun. 28-Jul. 1, 2009, Paris, France.
Ramaswamy et al., "Caesar: A Context-Aware, Social Recommender System for Low-End Mobile Devices," 2009 Tenth International Conference on Mobile Data Management: Systems, Services and Middleware.
Richardson et al., "Mining Knowledge-Sharing Sites for Viral Marketing," SIGKDD 2002, Edmonton, Alberta, Canada.
Tang et al., "Social Influence Analysis in Large-scale Networks," KDD'09, Jun. 28-Jul. 1, 2009, Paris, France.

\* cited by examiner

ALGORITHM 1 WEIGHTED BORDA

INPUT: $T_i = [T_{i1},...,T_{im}]$. $\forall i = 1,...,r$, ORDERED ARRANGEMENT OF $m$ CANDIDATES FOR $r$ RANKERS.
$w = [w_1,..., w_r]$ - WHERE $w_i$ IS THE WEIGHT FOR RANKER $i$
OUTPUT: $T$ - RANK AGGREGATED ARRANGEMENT OF CANDIDATES IN DECREASING ORDER OF IMPORTANCE 1) INITIALIZE $\beta_i \Leftarrow 0$, $\forall i = 1,..., m$, $\beta_i$ IS THE BORDA SCORE OF CANDIDATE $i$
2)   FOR EACH RANKER $p = 1$ TO $r$
3)     FOR EACH CANDIDATE $i = 1$ TO $m$
4)       $\beta_i \Leftarrow \beta_i + ((m - i + 1)w_p)$
5) FOR EACH CANDIDATE $i = 1$ TO $m$
6)   $\beta_i \Leftarrow \beta_i / r$
7) SORT IN DESCENDING ORDER, SUCH THAT
$T = [d_1,..., d_m], \beta_{d_i} > \beta_{d_j}$, $\forall i, j = 1,...,m, i \neq j$
8) RETURN $T$

---

ALGORITHM 2 WEIGHTED LOCAL KEMENY (LK)

INPUT: $T_i = [T_{i1},...,T_{im}]$. $\forall i = 1,...,r$, ORDERED ARRANGEMENT OF m CANDIDATES FOR r RANKERS.
$w = [w_1,..., w_r]$ - WHERE $w_i$ IS THE WEIGHT FOR RANKER $i$
$\mu = [\mu_1,..., \mu_M]$ - INITIAL ORDERED ARRANGEMENT OF M CANDIDATES
$k$ - THE NUMBER CANDIDATES TO CONSIDER IN EACH RANKERS PREFERENCE LIST ($k \leq m$)
OUTPUT: $T$ - RANK AGGREGATED ARRANGEMENT OF CANDIDATES IN DECREASING ORDER OF IMPORTANCE 1) INITIALIZE $M_{i,j} \Leftarrow 0, \forall i, j = 1,..., m$
2)   FOR EACH RANKER $p = 1$ TO $r$
3)     FOR EACH CANDIDATE $i = 1$ TO $k-1$
4)       FOR EACH CANDIDATE $j = i + 1$ TO $k$
5)         $M_{T_{pi}T_{pj}} \Leftarrow M_{T_{pi}T_{pj}} + w_p$
6) QUICK SORT $\mu$, USING $M_{\mu_i,\mu_j}$. IF $M_{\mu_i,\mu_j} - M_{\mu_j,\mu_i} > 0$ THEN $\mu_i$ IS GREATER THAN $\mu_j$. IF $M_{\mu_i,\mu_j} - M_{\mu_j,\mu_i} = 0$ THEN $\mu_i$ IS EQUAL TO $\mu_j$. IF $M_{\mu_i,\mu_j} - M_{\mu_j,\mu_i} < 0$ THEN $\mu_i$ IS LESS THAN $\mu_j$.
7) RETURN $T$

FIG. 6

PREDICTING INFLUENCE IN SOCIAL NETWORKS

CROSS REFERENCE TO RELATED APPLICATION

This application is a continuation of copending U.S. patent application Ser. No. 14/706,316, filed May 7, 2015, which is a continuation of U.S. patent application Ser. No. 13/206,981, filed Aug. 10, 2011. The entire contents and disclosures of U.S. patent application Ser. Nos. 13/206,981 and 14/706,316 are hereby incorporated herein by reference.

BACKGROUND OF THE INVENTION

The present invention generally relates to social network analysis, and more specifically, to predicting influence in social networks.

Over the past decade, the Internet has created new channels and enormous opportunities for companies to reach customers, advertise products, and transact business. In this well established business model, companies fully control their own web-based reputation via the content appearing on their websites. The advent of Web 2.0, with its emphasis on information sharing and user collaboration, is fundamentally altering this landscape. Increasingly, the focal point of discussion of all aspects of a company's product portfolio is moving from individual company websites to collaborative sites, blogs, and forums—collectively known as Social Media. In this new media essentially anyone can post comments and opinions about companies and their products, which may influence the perceptions and purchase behavior of a large number of potential buyers. This is of obvious concern to marketing organizations—not only is the spread of negative information difficult to control, but it can be very difficult to even detect it in the large space of blogs, forums, and social networking sites.

The extent to which any reputation can be impacted by a negative story depends heavily on where the story first appears. Negative sentiment posted on an influential blog is clearly more damaging than if it appears on an inconsequential blog. Conversely, marketing people may wish to inject a positive view into the blogosphere, and hence they need to know who are the most influential bloggers relevant to a specific topic. For this reason, rigorous measures of influence and authority are essential to social media marketing.

Micro-blogs like Twitter have raised the stakes even further relative to conventional blogs. Literally within minutes, a story or opinion can spread to millions of individuals. Clearly, the speed with which such a story propagates depends on the degree of influence carried by the nodes that immediately adopt the story.

Identifying the most important or prominent actors in a network has been an area of much interest in Social Network Analysis dating back to Moreno's work in the 1930's [J. Moreno, *Who shall Survive? Foundations of Sociometry, Group Psychotherapy and Sociodrama*. Washington D.C.: Nervous and Mental Disease Publishing Co., 1934.]. This interest has spurred the formulation of many graph-based socio-metrics for ranking actors in complex physical, biological and social networks. These sociometrics are usually based on intuitive notions such as access and control over resources, or brokerage of information [D. Knoke and R. Burt, *Applied Network Analysis*. Newbury Park, Calif.: Sage, 1983, ch. Prominence.]; and has yielded measures such as Degree Centrality, Closeness Centrality and Betweeness Centrality [S. Wasserman and K. Faust, *Social Network Analysis: Methods & Applications*. Cambridge, UK: Cambridge University Press, 1994.].

In the exploratory analysis of networks, the question of whether these measures of centrality really capture what we mean by "importance" is often not directly addressed. However, when such sociometrics start being used to drive decisions in more quantitative fields, there emerges a need to empirically answer this question. Probably the most popular of these measures in the Data Mining community is PageRank, which is a variant of Eigenvector Centrality [L. Katz, "A new status index derived from sociomertric analysis," *Psychometika*, vol. 18, pp. 39-43, 1953.]. Once its use in Information Retrieval (IR) and Web search in particular became popular, it led to more rigorous evaluation of PageRank and variants on measurable IR tasks [M. Richardson, A. Prakash, and E. Brill, "Beyond pagerank: machine learning for static ranking," in WWW, 2006.], [T. H. Haveliwala, "Topic-sensitive pagerank: A context-sensitive ranking algorithm for web search," *IEEE Trans. on Knowl, and Data Eng.*, vol. 15, no. 4, pp. 784-796, 2003].

With the rise of Web 2.0, with its focus on user-generated content and social networks, various socio-metrics are being increasingly used to produce ranked lists of "top" bloggers, twitterers, etc. Do these rankings really identify "influential" authors, and if so, which ranking is better? With the increased demand for Social Media Analytics, with its focus on deriving marketing insight from the analysis of blogs and other social media, there is a growing need to address this question.

BRIEF SUMMARY

Embodiments of the invention provide a method, system and computer program product for predicting influence in a social network. In one embodiment, the invention provides a method comprising identifying a set of users of the social network, and identifying a subset of the users as influential users based on defined criteria. A multitude of measures are identified as predictors of which ones of the set of users are the influential users. These measures are aggregated, and a composite predictor model is formed based on this aggregation. This composite predictor model is used to predict which ones of the set of users will have a specified influence in the social network in the future.

In one embodiment, messages are sent by and among the set of users of the network, and the specified influence is based on the messages sent from the users; and, for example, in an embodiment, the specified influence may be based on the number of messages sent from each user that are re-sent by other users.

In an embodiment, a training set of data is used to determine, for each of the measures, an effectiveness of the measure as predicting which ones of the set of users sent the messages that were most re-sent by other users. In this embodiment, the measures are aggregated based on the determined effectiveness of each of the measures. In one embodiment, all of the multitude of measures are used to form the composite predictor model. In an embodiment, only some of the multitude of measures are used to form the composite predictor model. In one embodiment, the composite predictor model is formed by combining all of said measures through logistic regression.

In one embodiment, the set of users is separated into different classes according to degrees of influence of the users based on said defined criteria, and the composite predictor model is used to predict how often users in these different classes will have the specified effect in the social network in the future.

In an embodiment, the set of users is separated into different classes according to a degree of influence of each of the users based on said defined criteria, and the aggregating of the measures is based on an accuracy of each of the measures as a predictor of which of the users are in which of the classes.

In an embodiment, different weights are assigned to the multitude of measures to form a supervised rank aggregation of these measures, and this supervised rank aggregation is used to form the composite predictor model.

BRIEF DESCRIPTION OF THE SEVERAL VIEWS OF THE DRAWINGS

FIG. 6 shows two algorithms that may be used in embodiments of the invention.

DETAILED DESCRIPTION

Figure 1:
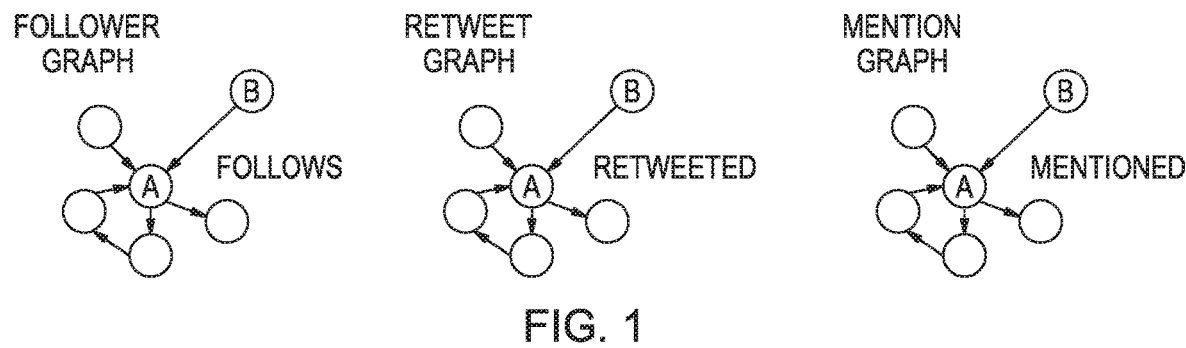
FIG. 1 shows graphs based on three different relationships between users of a social network.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to social network analysis, and more specifically, to predicting influence in social networks. The question of whether a particular influence measure is good is ill-posed, unless it is put in the context of a measurable task or desired outcome. Constructing such predictive tasks of interest, not only guides the choice of relationships, but also allows for the quantitative comparison of different socio-metrics.

Taking a predictive perspective of measures of influence can also suggest alternative socio-metrics, and embodiment of the invention combine aspects of different measures to produce a composite ranking mechanism that is most beneficial for each desired predictive task. Embodiments of the invention compare several approaches to combining influence measures through rank aggregation methods, such as approximation of Kemeny optimal aggregation [G. Dwork, R. Kumar, R. Naor, and D. Sivakumar, "Rank aggregation methods for the web," in WWW, 2001]. In addition, embodiments of the invention use novel supervised rank aggregation techniques that leverage the ground truth on a subset of users to further improve ranking.

One embodiment of the invention that has been actually reduced to practice is based on a case study of forty-million users of the social networking website Twitter.

Twitter is a free social networking and microblogging service that enables its users to post and read messages known as tweets. Tweets are short texts of up to 140 characters. They are displayed on the profile page of the author, as a response to any search that matches the keywords, and delivered to the author's subscribers who are known as followers. All users can send and receive tweets via the Twitter website, Short Message Service (SMS) or external applications. Many of the more formal interactions discussed below (retweet, mention and reply) have grown out of the usage patterns and are only now starting to be formalized and embedded in the Twitter interface.

Follower/Friend: Any Twitter user i can choose to follow another user k. This primarily means that user i will be able to see the tweets posted by user k. User i is called a follower of user k and sometimes the inverse relationship is denoted as k being a friend of i.

Retweet: When a user i wants to share a tweet by k with his followers, he can retweet that tweet. This will add the username of k in the form "RT @k" to the beginning of the tweet and copy the content of the original after that.

Reply: Some users communicate via Twitter with each other. If user i wants to talk to or reply to user k the tweet would start with "@k" followed by the message.

Mention: If you do not want to talk to somebody but rather about somebody the username appears somewhere later in the tweet and it will be called a mention.

Hashtags: These tokens originated as a community-driven convention for adding metadata to tweets. They appear in the tweet preceded by a "#", and are primarily used to create groupings.

Data Collection and Graph Construction

The first set of data that we collected through Twitter's Search API was by searching on terms referring to "Company A".

Base User List: A keyword search on "Company A" generated a list of tweets available for the last 7-10 days. This data was gathered regularly for a month. We then built a list of 9625 users that had made the most recent tweets in this set. This was our base set of users for the balance of the study.

We are interested in the social networks and how people influence each other leading to viral phenomena. The first question is how do we define the social Twitter graph? One answer would be the follower relationship. The advantage of the follower graph illustrated in FIG. 1, is that it is easily obtainable through the Twitter API. However, many users have 100K or more friends and therefore following may not be a very strong relationship that really influences behavior. For this reason, we examine two other graphs also described below, illustrated in FIG. 1.

Follower Graph: The follower graph was generated by obtaining information about each user through the Twitter REST API. We started with the base list of 9625 users, and added all their followers. This first iteration added ~2.5 million new unique users. A second iteration of the same process results in ~35 million users. Note that this does not imply that the users are active, only that they were in the system during our data pull between November 23 and Nov. 29, 2009.

TABLE I

GRAPH STATISTICS

| Statistic | Follower Graph | Retweet Graph | Mention Graph |
|---|---|---|---|
| Number of users | 39,855,505 | 412,774 | 637,509 |
| Number of edges | 1,098,443,217 | 975,326 | 1,473,361 |
| Max. in-degree | 3,985,581 | 9,860 | 14,313 |
| Max. out-degree | 153,926 | 1,318 | 4,427 |

In addition to the somewhat static Follower Graph, we consider two alternative, implicitly embedded graphs that reflect the users current behavior: the Retweet Graph and the Mention Graph. We build graphs of who retweeted whom and who is talking to or about whom. Unfortunately this information is not directly available and has to be extracted from the tweets. As noted above, both retweet and mention/reply will create tags that start with a "@", followed by the name of the user that is replied to, mentioned, or retweeted. To identify tweets that contain this information, we started with our base list of 10K users. We then search for all tweets that contained any of the usernames in our base list preceded by "@". We obtained a unique list of users that made these tweets—they either mentioned a user in the base list or retweeted a tweet by a user in the base list. Using this list we pulled a second iteration of tweets. We repeated this one more time to generate a third iteration. The three iterations cover tweets during the time period from November 2011 to Nov. 19, 2009. From these three iterations, we can extract a) links between users originating from retweets and b) links between users that reflect mentions or replies.

Retweet Graph and Weighted Retweet Graph: We parse all three iterations of tweets from the previous searches and extract only those tweets by a user i that start with the indicators of retweets, such as "RT @k". A link from user i to user k in this graph means that i is retweeting k. We generate two versions of the retweet graph, one collapsing all repeat retweets from the same user i to the user k into just one edge. The second version uses the number of retweet instances as edge weights.

Mention Graph and Weighted Mention Graph: The only difference in the construction of the Mention Graph over the Retweet Graph is that we ignore any retweets starting with "RT" and only look for occurrences of names in the text of the tweet. We generate two versions of the Mention Graph just as we did for the Retweet Graph. The dimensions of these graphs are presented in Table I.

Test Data: Ultimately we want to predict outbursts of retweets. So once these three graphs were generated, we continued obtaining additional data over the next week from November 2026 to Dec. 3, 2009. We gathered the first iteration of the retweet graph to keep track of how often the users in the base list were retweeted. We also collected all of the tweets by the original 10K users.

Measure Definition

TABLE II

MEASURE DEFINITIONS

| Measure | Definition |
|---|---|
| Followers | Follower Graph Indegree |
| Friends | Follower Graph Outdegree |
| Follower Pagerank | Follower Graph Pagerank |
| Distinct Past Retweets | Retweet Graph Indegree |
| People Retweeted | Retweet Graph Outdegree |
| Retweet Pagerank | Retweet Graph Pagerank |
| Past Retweets | Weighted Retweet Graph Indegree |
| Retweets Made | Weighted Retweet Graph Outdegree |
| Distinct Mentions Received | Mention Graph Indegree |
| People Mentioned | Mention Graph Outdegree |
| Mention Pagerank | Mention Graph Pagerank |
| Mentions Received | Weighted Mention Graph Indegree |
| Mentions Made | Weighted Mention Graph Outdegree |

For any directed graph we can compute the following measures on the nodes: in-degree (number of arcs pointing to the node), out-degree (number of arcs pointing from the node), PageRank (measure described in [S. Brin and L. Page, "The anatomy of a large-scale hypertextual web search engine," *Computer Networks*, vol. 30, no. 1-7, pp. 107-117, 1998.]). We generate these measures for each of the three graphs and the weighted variants described earlier. Table II lists the graph measures, along with more intuitive names, and some statistics on each for our 10K base user list. We also include the target variable, i.e., the number of retweets during the test phase, and the number of tweets during the same phase for these users. Instead of using the raw graph-based measures described above, we transformed them into percentiles. Empirically we found that percentile rank transformation (essentially converting it into a uniform distribution) worked better for modeling than using the raw values or a log-transformation.

Activity Statistics

Figure 2:
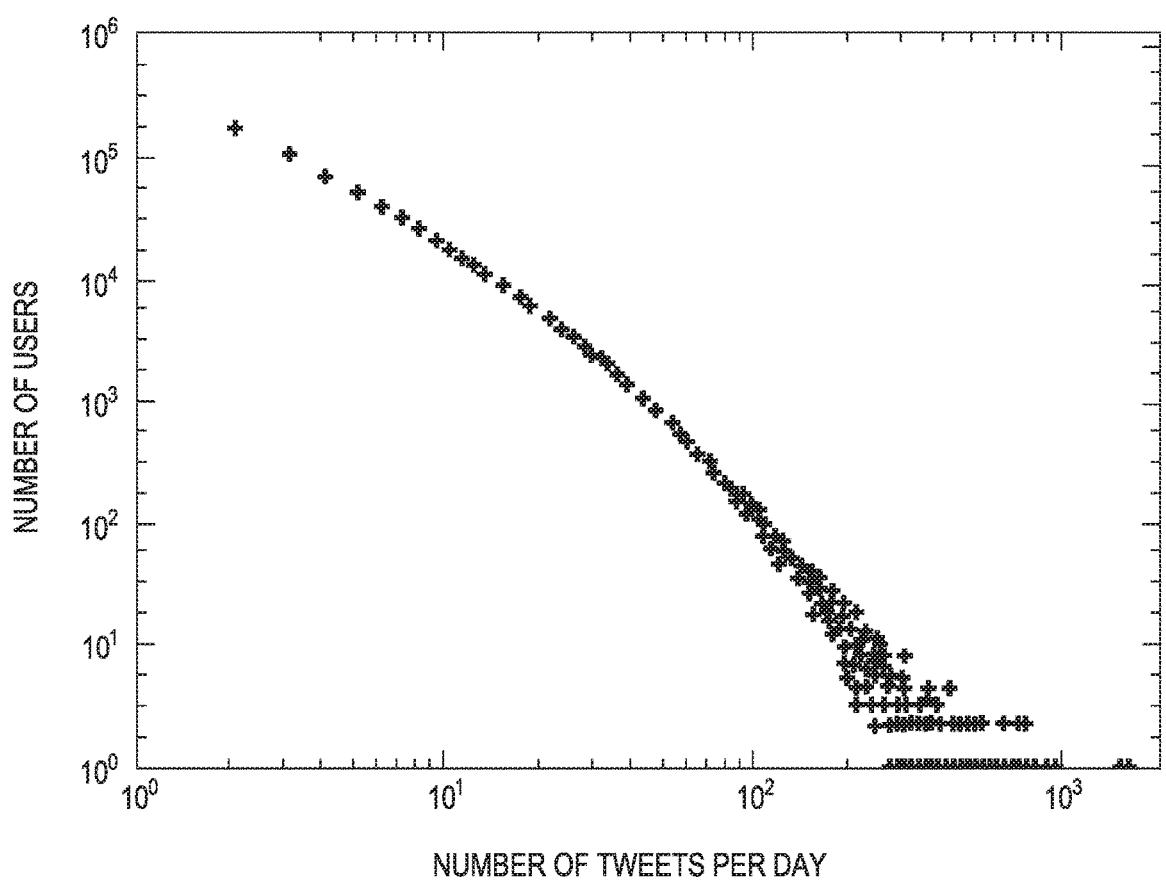
FIG. 2 illustrates a procedure for evaluating measures of influence in a social network.

Additionally, we analyzed Twitter user activity data for 2.4 million users in our data set. We found that 713,464 of these users had no tweets in over 30 days, and are possibly inactive or read-only users. The average tweets per day was 3.24 (4.40 if we exclude the inactive users). FIG. 2 shows the distribution of user activity in this universe.

Identifying Viral Potential

One of the biggest opportunities and threats presented by social media is the viral outbreak of messages, videos, tweets, memes [J. Leskovec, L. Backstrom, and J. Kleinberg, "Meme-tracking and the dynamics of the news cycle," in *KDD*, 2009.], etc. For marketing and PR organizations this can be a boon or curse based on the sentiment expressed in these messages towards specific brands, products or entities. As such, marketers are constantly looking for ways to influence positive outbreaks or thwart negative ones. Either way, they often base their actions on the perceived importance of authors in the social media space.

In the micro-blogging universe of Twitter, this suggests that a useful task would be to predict which twitterers will be significantly rebroadcasted via retweets. We construct such a task from our data by dividing users in our test phase into two classes—people who have been retweeted 100 [8] or more times within a week, and those who have not.

Figure 3:
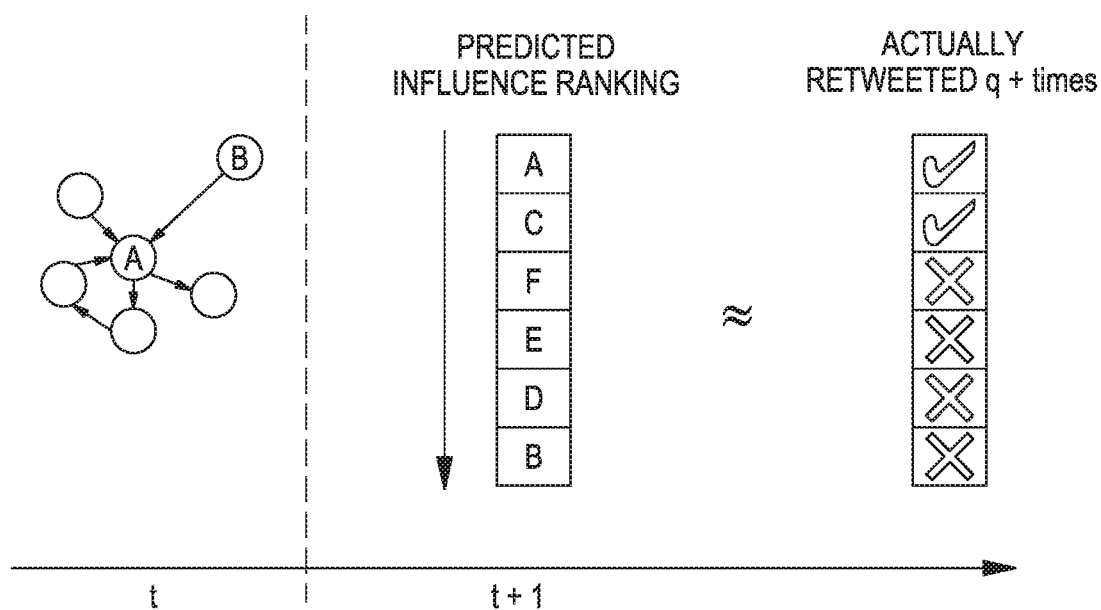
FIG. 3 is a graph showing the distribution of activity of a set of Twitter users.

Roughly 1.6% of our population (151 people) fall in the first target class. With reference to FIG. 3, we treat this as a binary classification problem, where we use logistic regression to train a model on the different ranking measures on historical data, and then use it to predict the potential for viral retweeting in the test time period.

Figure 4:
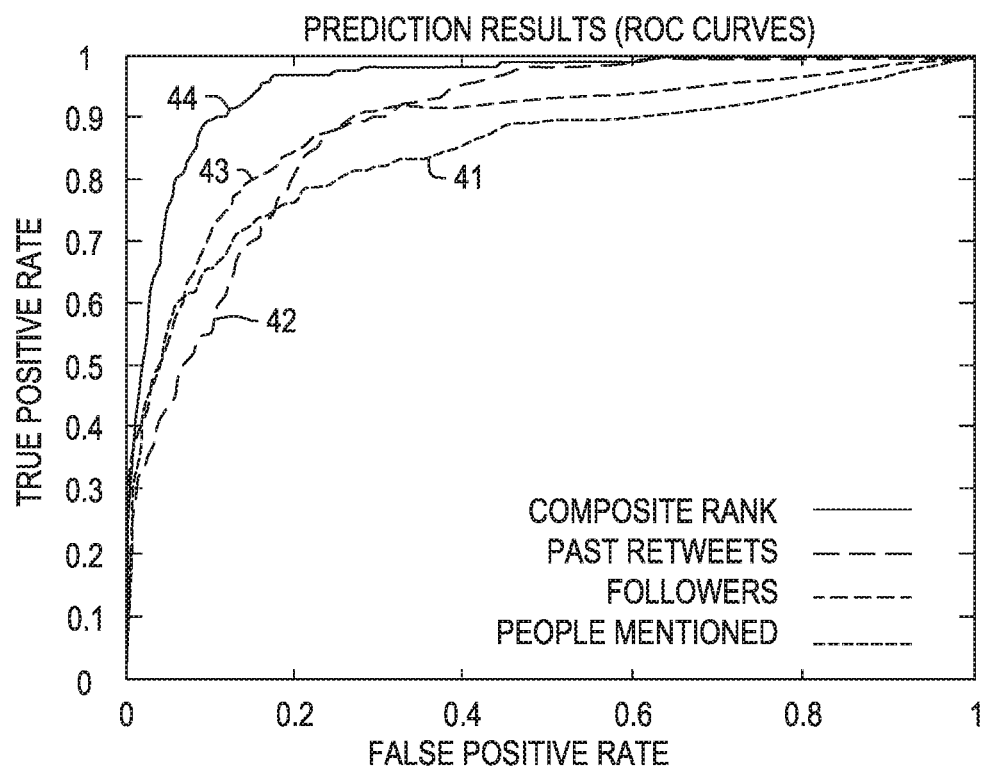
FIG. 4 is a graphs illustrating the results of combining different socio-metrics to predict influential people in a social network.

With reference to FIG. 4, since we are primarily concerned with how well these measures perform at ranking users, we compare the area under the ROC curve (AUC) based on using each measure by itself, as well as a composite model that uses all measures as independent variables in a logistic regression model. In FIG. 4, curves 41 and 42 show the true positive rate vs. false positive rate using, respectively, people mentioned and followers as the metric. Curve 44 shows the true positive vs. false positive using past retweets as the metric, and curve 45 shows the true positive rate vs. the false positive rate using a composite ranking as the metric.

The results of our 10-fold cross-validation experiments are summarized in Table III. We find that 9 of the 13 measures by themselves are quite effective at ranking the top potentially viral twitterers with an AUC>0.8. Not surprisingly, the total number of times that someone has been retweeted in the recent past, as well the number of distinct people who have retweeted this person, are the most predictive measures. However, just using the number of followers produces an equally good ranking. Note that the Spearman rank correlation between Distinct Past Retweets and Followers is not high (0.43), suggesting that there are multiple forces at work here.

Figure 5:
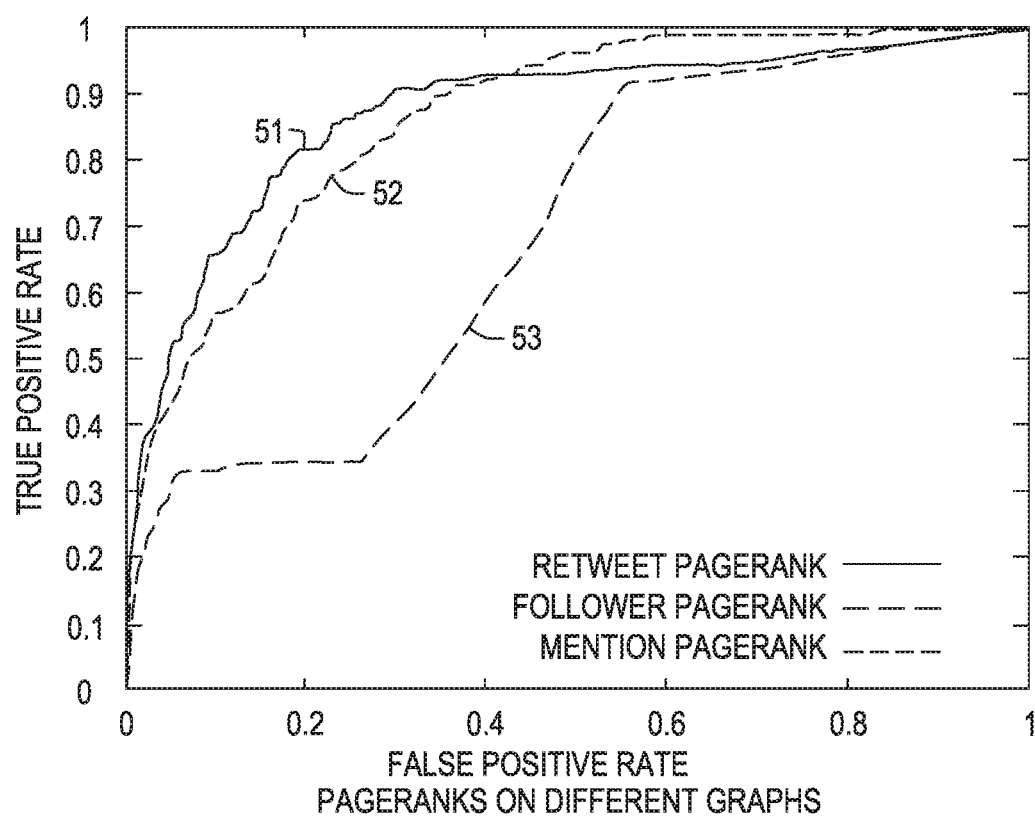
FIG. 5 is a graph showing PageRanks on different graphs.

Pageranks on the Retweet Graph and Follower Graph also perform well (FIG. 5), but not as well the in-degree measures on the corresponding graphs. This may suggest that for people who are retweeted a lot, it is sufficient to deduce this from their immediate neighbors in the Follower Graph and Retweet Graph. It would appear that the intuition behind PageRank, that links from people with higher ranks are more important, does not apply in this case. In FIG. 5, the Retweet graph is shown at 51, the Follower graph is shown at 52, and the Mention graph is shown at 53.

Finally, we observe that combining all measures through logistic regression provides a substantially better ranking than any one of these measures in isolation. This improvement can be seen in FIG. 4, where we compare the composite ranking to the best individual measure

TABLE III

COMPARING DIFFERENT RANKING MEASURES FOR IDENTIFYING POTENTIAL FOR VIRAL REBROADCASTING.

| Measure | AUC |
|---|---|
| Past Retweets | 0.884 |
| Distinct Past Retweets | 0.884 |
| Followers | 0.884 |
| Retweet Pagerank | 0.870 |
| Follower Pagerank | 0.862 |
| People Retweeted | 0.844 |
| Retweets Made | 0.842 |
| People Mentioned | 0.841 |
| Mentions Made | 0.828 |
| Friends | 0.760 |
| Mention Pagerank | 0.685 |
| Distinct Mentions Received | 0.560 |
| Mentions Received | 0.560 |
| Composite | 0.953 | from each graph. In addition, we performed ablation studies, where we built three additional composite models as before but ignored either the Retweet Graph, Follower Graph or Mention Graph in each. The ranking results, presented in Table IV, show that removing measures from any of the three graphs diminishes our ability to identify viral potential. This underscores the fact that each aspect (network of followers, diffusion of past retweets, and interactions through replies and mentions) contributes to one's potential to reach a large audience. By focusing on selecting a single centrality measure to capture influence we would miss out on the opportunity to more precisely detect potentially viral tweets.

TABLE IV

COMPARING PERFORMANCE WITHOUT USING MEASURES FROM EACH GRAPH. THE BASELINE AUC IS 0.953.

| Ablation | AUC |
| --- | --- |
| No Retweet Graph | 0.926 |
| No Mention Graph | 0.948 |
| No Follower Graph | 0.908 |

Predicting Level of Attention

Though identifying the most influential players is usually paramount, marketing organization are also keen to understand their entire customer base. This suggests an alternative to focusing on the most retweeted individuals, which is to predict different levels of audience attention a twitterer receives. For this task, we divide users into four classes based on the amount a person is retweeted, and try to predict this level of retweeting from historical data. The class definitions and sizes are presented in Table V. As before we run experiments comparing the performance of each individual ranking measure versus logistic regression applied to all measures. Since we care about effectively segmenting the population, we compare overall classification accuracy on the 4-class problem, presented in Table VI.

TABLE V

DEFINITION OF CLASSES BASED ON LEVEL OF ATTENTION.

| Class | Range of retweets | Class Size |
| --- | --- | --- |
| None | 0 | 4743 |
| Low | 1-19 | 3936 |
| Medium | 20-99 | 795 |
| High | >99 | 151 |

As in the task of predicting viral potential, we observe that while several measures help discriminate between classes, the composite of these measures performs best. This reinforces our position that different aspects of each networks can all contribute bits of information that help predict the level of attention an author will received more effectively. Note that the best overall accuracy of 69% is not high, which is an artifact of the high imbalance in class sizes. The ranking on each class however, is quite good, ranging from an AUC of 0.77 to 0.95. Nevertheless, we use accuracy as it serves as a good summary statistic, allowing us to compare relative performance across classes.

It is important to note that the top predictive measures for this task are different from the previous task. Notably, Retweet Pagerank is more effective than Past Retweets, which was the best ranking measure for the viral task. One possible explanation is that, while Past Retweets is sufficient in identifying the top retweeted, the level of second degree retweeting is more relevant when discriminating the users with low and medium levels of audience attention.

TABLE VI

COMPARING DIFFERENT RANKING MEASURES FOR PREDICTING THE ATTENTION A TWITTERER WILL RECEIVE.

| Measure | Accuracy |
| --- | --- |
| Retweet Pagerank | 64.89 |
| Followers | 64.52 |
| People Mentioned | 63.63 |
| People Retweeted | 63.40 |
| Retweets Made | 63.38 |
| Follower Pagerank | 63.31 |
| Mentions Made | 62.60 |
| Friends | 61.79 |
| Past Retweets | 61.16 |
| Distinct Past Retweets | 60.87 |
| Mention Pagerank | 60.51 |
| Mentions Received | 53.74 |
| Distinct Mentions Received | 53.49 |
| Composite | 69.07 |

There are a lot of factors that could influence different levels of retweeting that are beyond what is captured by the network measures we examine, e.g., hot topics in the news. We would like to clarify that our objective is not to develop the best model for prediction on this task. Instead, we want to illustrate that constructing tasks such as this, allows us to quantitatively compare socio-metrics and aid in the selection of one or a composite of such centralities.

Rank Aggregation

In the discussion above, we have shown that combining influence measures performs better than any single measure. So far, we have used logistic regression in order to combine the scores produced by each influence measure to produce a composite score. However, given that the individual influence measures produce an ordering of elements and not just a point-wise score, we can, instead leverage approaches of aggregating rankings. Methods for rank aggregation or preference aggregation have been used extensively in Social Choice Theory, where there is no ground truth ranking, and as such are unsupervised. Here, we introduce several supervised approaches to rank aggregation that can be trained based on the ground-truth ordering of a subset of elements. In the discussion below, we compare several unsupervised and supervised approaches of aggregating rankings for the task of predicting viral potential.

The Rank Aggregation Task

We begin by formally defining the general task of rank aggregation. Given a set of entities S, let V be a subset of S and assume that there is a total ordering among entities in V. We are given r individual rankers $\tau_1, \ldots, \tau_r$ who specify their order preferences of the m candidates, where m is size of V, i.e., $\tau_i = [d_1, \ldots, d_m]$, $i=1, \ldots, r$, if $d_1 > \ldots > d_m$, $d_j \in V$, $j=1, \ldots, m$. Rank aggregation function takes input orderings from r rankers and gives $\tau$, which is an aggregated ranking order. If V equals S, then $\tau$, is called a full list (total ordering), otherwise it is called a partial list (partial ordering).

All commonly-used rank aggregation methods, satisfy one or more of the following desirable goodness properties [H. Young and A. Levenglick, "A consistent extensionof condorcet's election principle," in *SIAM Journal of Applied Math*, vol. 35(2), 1978, pp. 285-300].

Unanimity: If every ranker prefers $d_i$ to $d_j$, $i \neq j$, then the aggregate ordering prefers $d_i$ to $d_j$.

Non-dictatorial: At least two voters should have the potential to affect the outcome.

Independence from irrelevant alternatives: Relative order of $d_i$ and $d_j$ in aggregate only depends on relative order of $d_i$ and $d_j$ in input orderings.

Neutrality: If two candidates switch positions in every input ordering, then they must switch positions in aggregate.

Consistency: If rankers are split into P and Q, and both the aggregate of P and aggregate of Q prefers $d_i$ to $d_j$, then aggregation P∪Q should also prefer $d_i$ to $d_j$.

Condorcet Criterion: A Condorcet winner, player preferred by most rankers to any other candidate, should be ranked first in aggregate.

Extended Condorcet Criterion (ECC): Let us split the entities into two partitions, Q and R. If for all $d_i \in Q$ and $d_j \in R$, a majority of rankers prefer $d_i$ to $d_j$, then the aggregate should prefer $d_i$ to $d_j$.

In the discussion below, we compare rank aggregation methods that satisfy some of the above properties, as well as supervised versions of these methods.

Borda Aggregation

In Borda rank aggregation [J. Borda, "Memoire sur les elections au scrutin," in *Histoire de l'Academie Royale des Scinences*, 1781.], each candidate is assigned a score by each ranker; where the score for a candidate is the number of candidates below him in each ranker's preferences. The Borda aggregation is the descending order arrangement of the average Borda score for each candidate averaged across all ranker preferences. Borda satisfies all goodness characteristics except Condorcet and Extended Condorcet Criteria. In fact, it has been shown that no method that assigns weights to each position and then sorts the results by applying a function to the weights associated with each candidate satisfies the Condorcet criterion. This includes the logistic regression approach we used in previous sections. This motivates us to consider order-based methods for rank aggregation that satisfies both Condorcet criteria.

Kemeny Aggregation

Kemeny is an order-based aggregation method [J. Kemeny, "Mathematics without numbers," in *In Daedalus*, vol. 88, 1959, pp. 571-591.], in which the final rank aggregation reduces the number of pairwise disagreements between all the rankers, i.e., the average Kendall-Tau distance between to $\tau_i$, i=1, r is minimum. Kemeny Optimal Aggregation is the only function that is neutral, consistent and satisfies the Condorcet criteria. However, it has been shown that computing Kemeny aggregation for r≥4, is NP-Hard. So, instead we use Local Kemenization [C. Dwork, R. Kumar, R. Naor, and D. Sivakumar, "Rank aggregation methods for the web," in WWW, 2001.], which is a relaxation of Kemeny Optimal aggregation that still satisfies the Extended Condorcet Criterion.

Local Kemenization is computationally tractable in practice, as opposed to Kemeny Optimal Aggregation. A full list τ is locally Keenly optimal, if there is no full list τ* that can be obtained by single transposition of adjacent pair of elements, such that, where, $$K(\tau^+,\tau_1,\ldots,\tau_r)<K(\tau,\tau_1,\ldots,\tau_r)$$

$$K(\tau,\tau_1,\ldots,\tau_r)=1rrXi=1k(\tau,\tau_i)$$

The function $k(\sigma, \tau)$ is Kendall tau distance which is the number of pairwise disagreements between two lists σ and τ. In other words, it is impossible to reduce the total distance across all rankers from the local Kemeny aggregation, by flipping an adjacent pair in τ. Every Kemeny optimal aggregation is also locally Kemeny optimal, whereas the converse is false. Dwork et al. [C. Dwork, R. Kumar, R. Naor, and D. Sivakumar, "Rank aggregation methods for the web," in WWW, 2001.] show that Local Kemenization satisfies the Extended Condorcet Criterion and can be computed in O(rmlogm), where m is the size of V. The local Kemeny procedure can be viewed as a stable sorting algorithm, where given an initial ordering, elements di and dj are only swapped if di is preferred to dj by the majority of rankers (τ's). It is important to note that the initial aggregation passed to Local Kemenization may not necessarily satisfy Condorcet criteria. However, the process of Local Kemenization produces a final ranking that is maximally consistent with the initial aggregation, and in which Condorcet winners are at the top of the list.

Supervised Rank Aggregation

Borda and Kemeny aggregations, being motivated from social choice theory, strive for fairness and hence treat all rankers as equally important. However, fairness is not a desirable property in our setting, since we know that some individual rankers (measures) perform better than others in our target tasks—as evidenced by results in Tables III and VI. If we knew a priori which rankers are better, we could leverage this information to produce a better aggregate ranking. In fact, given the ordering of a (small) set of candidates, we can estimate the performance of individual rankers and use this to produce a better ranking on a new set of candidates. We use such an approach to produce different supervised rank aggregation methods, which we describe in more detail below.

In order to accommodate supervision, we extend Borda and local Kemeny aggregation to incorporate weights associated with each input ranking. The weights correspond to the relative utility of each ranker, which may depend on the task at hand. In this section, we focus on the task of viral prediction as described the discussion below. As such, we weight each ranker based on its (normalized) AUC computed on a validation (training) set of candidates, for which we know the true retweet rates. Incorporating weights in Borda aggregation is relatively straightforward, where instead of simple averages, we take weighted averages of Borda scores. This weighted version of Borda is presented in Algorithm 1 in FIG. 6. When called with uniform weights, we will refer to the algorithm simply as Borda. When used with weights based on training set performance, we will refer to it as Supervised Borda.

For supervised Local Kemenization, we incorporate weights directly in sorting the initial ordering. So, instead of comparing candidates based on the preference of the simple majority of individual rankers, we use a weighted majority. This can be achieved by using weighted votes during the creation of the majority table M—which represents the sum of weights of the rankers who prefer the row candidate to the column candidate for each pairwise comparison. This weighted Kemeny procedure is presented in Algorithm 2 in FIG. 6. As with Supervised Borda, we select weights based on each ranker's AUC computed on a training set. When Algorithm 2 is invoked with uniform weights, we will refer to it as Local Kemenization or LK. When used with the performance-based weights, we will refer to it as Supervised LK. Instead of using total orderings provided by each ranker, we can also use partial orderings (for a subset of candidates). Of particular interest, is using the partial ordering only on the top k candidates for each ranker. We refer to this variant as Local Kemeny TopK (LK TopK). In Algorithm 2, setting k to ISI (the default) corresponds to Local Kemenization on total orderings. Local Kemenization is sensitive to the initial input ordering μ provided to the algorithm. We experimented with initializing with Borda and Supervised Borda.

Our weighted Local Kemenization algorithm can run with varying three options, namely (1) with and without supervision, (2) with total orderings or partial (top K) orderings, and (3) with different initial orderings. We experimented with several combinations of these three options. By default, Local Kemenization (LK) refers to unsupervised Local Kemenization with total orderings and initializing with Borda. All other variants are listed in Table VII, where the names list the departures from these defaults, and the initial ordering is mentioned in parentheses, e.g. Supervised LK TopK (Supervised Borda) corresponds to using Supervised Borda for initialization, partial orderings for top K and the supervised version of Local Kemenization. In all our experiments with partial orderings we use the top ranked 15% of candidates for each ranker.

Experimental Results

We compared the different supervised and unsupervised rank aggregation techniques described above on the task of predicting viral potential. As inputs to each aggregation method we use the 13 different measures listed in Table III. Each measure is used to produce a total ordering of preferences over the 9625 candidates (twitter users), where ties are broken randomly. We compared 8 rank aggregation methods (See Table VII) to the logistic regression-based approach discussed above.

Note that the results using logistic regression are based on 10-fold cross-validation. This means that the ground truth on 90% (≈9000) twitter accounts is used for training. In practice, we may expect to have the ground truth labeling only for a small validation/training set. So here we experiment with smaller training sets, comparing performance with increasing amounts of labeled data. We average performance, measured by AUC, over 20 runs of random stratified train-test splits for different percentages of data used for training. Our results are presented in Table VII and the most relevant comparisons can be seen in FIG. 4. As baselines, we also compared with all 13 individual measures, but in the interest of brevity we only list the best individual measure (Past Retweets) in our results.

Figure 7:
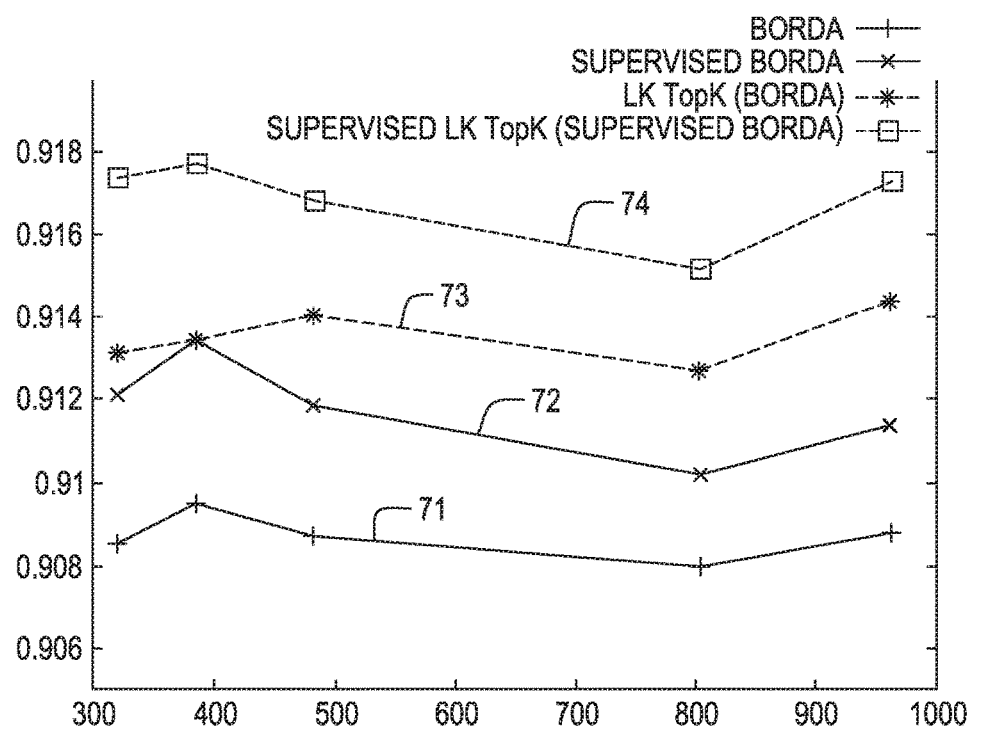
FIG. 7 is a graph comparing supervised vs. unsupervised rank aggregation methods.

As expected, the supervised versions of each rank aggregation method performed better than the unsupervised versions. This distinction can be seen clearly in FIG. 7, which compares the results of two pairs of aggregation approaches. In FIG. 7, the performance of the Borda method and the supervised Borda method are shown at 71 and 72, respectively. The results of the Local Kemenization are shown at 73, and the results of the supervised Local Kemenization are shown at 74. We also observe that all aggregation techniques improve over the best individual rank measures. The exception here is Local Kemenization on total orderings, which can often perform worse than Borda and Past Retweets. This is counter to what one might expect from the work of Dwork et al. [C. Dwork, R. Kumar, R. Naor, and D. Sivakumar, "Rank aggresation methods for the web," in WWW, 2001]. However, the real benefit to using Local Kemenization can be seen when it's applied only to the partial ordering of the top k candidates of each component ranking. When applied to partial orderings, LK TopK performs better than Borda. These results are improved by using the supervised weighted version Supervised LK TopK; which are further improved by using Supervised Borda as the initial ranking.

Figure 8:
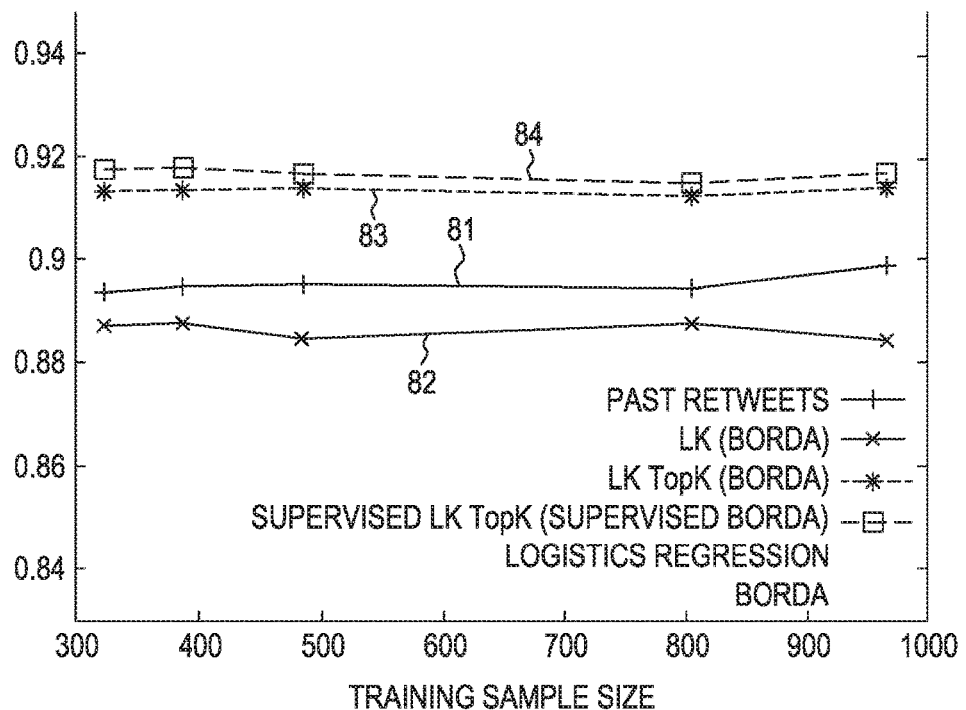
FIG. 8 illustrates the performance of rank aggregation techniques with increasing training data.

In FIG. 8 we see that, while logistic regression performs well with ground truth on a large number of candidates, its performance drops significantly with lower levels of supervision. In contrast, our supervised rank aggregations methods are fairly stable, consistently beating the best individual ranking and performing better than logistic regression in the more realistic setting of moderately-sized training sets. In FIG. 8, the results of the Past Retweets and of the Local Kemenization are shown at 81 and 82, respectively. The results of the LK TopK method are shown at 83, and the results of the Supervised LKTopK method are shown at 84. Notably, the best performing approach is Supervised LK

TABLE VII

RANK AGGREGATION PERFORMANCE MEASURED IN AUC FOR VARIOUS TRAINING SET SIZES

| Ranking Method | Training Sample Size (%) | | | | |
|---|---|---|---|---|---|
| | 3% | 4% | 5% | 8% | 10% |
| Borda | 0.9085 | 0.9095 | 0.9087 | 0.9079 | 0.9087 |
| Supervised Borda | 0.9121 | 0.9134 | 0.9118 | 0.9101 | 0.9113 |
| LK (Borda) | 0.8872 | 0.8877 | 0.8843 | 0.8878 | 0.8848 |
| Supervised LK (Borda) | 0.8872 | 0.8897 | 0.8862 | 0.8878 | 0.8857 |
| LK TopK (Borda) | 0.9131 | 0.9134 | 0.914 | 0.9126 | 0.9143 |
| Supervised LK TopK (Borda) | 0.9137 | 0.9139 | 0.9149 | 0.9126 | 0.9144 |
| LK TopK (Supervised Borda) | 0.9131 | 0.9134 | 0.914 | 0.9126 | 0.9143 |
| Super. LK TopK (Super. Borda) | 0.9174 | 0.9177 | 0.9168 | 0.9151 | 0.9172 |
| Logisitic Regression | 0.8435 | 0.8744 | 0.9055 | 0.9149 | 0.9311 |
| Past Retweets | 0.8935 | 0.8947 | 0.8954 | 0.8944 | 0.8991 |

TopK (Supervised Borda). Which confirms the advantages of supervised locally optimal order-based ranking compared to score-based aggregation, as in Borda, and unsupervised methods.

Who is Going Viral?

In the discussion below, we provide a qualitative analysis of our data, taking a closer look at a number of twitterers who are most often retweeted. What is most interesting is the diversity in the behavior on Twitter. Table VIII shows the top 8 users with more than 500 retweets in the week-long test period. Here we observe anecdotally that no single one measure is a good indicator of viral potential. Comparing to previous time periods, only the top 2 users have consistently high retweet rates. However, some others, e.g., go from 3 or 7 retweets in one week to more than 500 in the next. Looking at the actual tweets, we identify at least 4 archetypes in our dataset:

The Web-aggregator is very active on Twitter and the Internet in general. He or she posts many tweets, the majority of which have shortened URL's to other web content. He is typically not retweeting too much himself, but is following a

TABLE VIII

STATISTICS ON THE 8 MOST REBROADCASTED USERS

| User | Followers | Friends | Past Retweets | Retweets Made | Mention Received | Mentions Made | Tweets (test) | Retweets (test) | Distinct Past Retweets |
|---|---|---|---|---|---|---|---|---|---|
| Flipbooks | 25539 | 8129 | 940 | 27 | 534 | 83 | 1604 | 2904 | 1029 |
| chrisbrogan | 215626 | 85485 | 1965 | 26 | 2383 | 72 | 585 | 1110 | 971 |
| trinarockstarr | 230418 | 189 | 7 | 0 | 0 | 2 | 138 | 1017 | 742 |
| cardosoa | 33104 | 119 | 107 | 26 | 0 | 60 | 625 | 990 | 531 |

TABLE VIII-continued

STATISTICS ON THE 8 MOST REBROADCASTED USERS

| User | Followers | Friends | Past Retweets | Retweets Made | Mention Received | Mentions Made | Tweets (test) | Retweets (test) | Distinct Past Retweets |
|---|---|---|---|---|---|---|---|---|---|
| lizarddawg | 17187 | 8975 | 380 | 2 | 548 | 88 | 1920 | 967 | 409 |
| buzzedition | 92585 | 46169 | 109 | 42 | 0 | 173 | 733 | 831 | 698 |
| therealtarji | 41541 | 27 | 3 | 1 | 0 | 1 | 63 | 727 | 635 |
| littleanglemee | 703 | 298 | 66 | 22 | 69 | 14 | 1800 | 694 | 53 | fair number of users. Examples of this category are flipbooks, chrisbrogan, buzzedition, and lizarddawg. The topics they mention can be diverse: some users in this group promote political views—some of which are rather controversial.

The provocateur posts strong personal statements and sometimes links to provocative external content. She is apparently an aspiring actress with a notable fan base reading her tweets. This type of effective viral creator posts a limited number of tweets, has many followers but is following only a moderate number of other users and has many more retweets than tweets. The other user in this class is cardoso.

The self/event promoter is similar to the previous category, but is using Twitter as one of many platforms to specifically promote her/himself and special events. Depending on the degree of success we see a much larger list of followers over the number of users being followed. An example is trinarockstarr. Note that in the past there was very little activity in her account. The activity in the prediction period is related to the Orlando Classic Concert where she was performing.

The conversationalist is using twitter very extensively, as a substitute for instant messaging, to have a group chat with friends, e.g. littleanglemee. For such users, we see a rather small number of followers and a small list of users being followed. The most notable characteristic of this category is that the number of unique users retweeting a conversationalist is very small.

Figure 9:
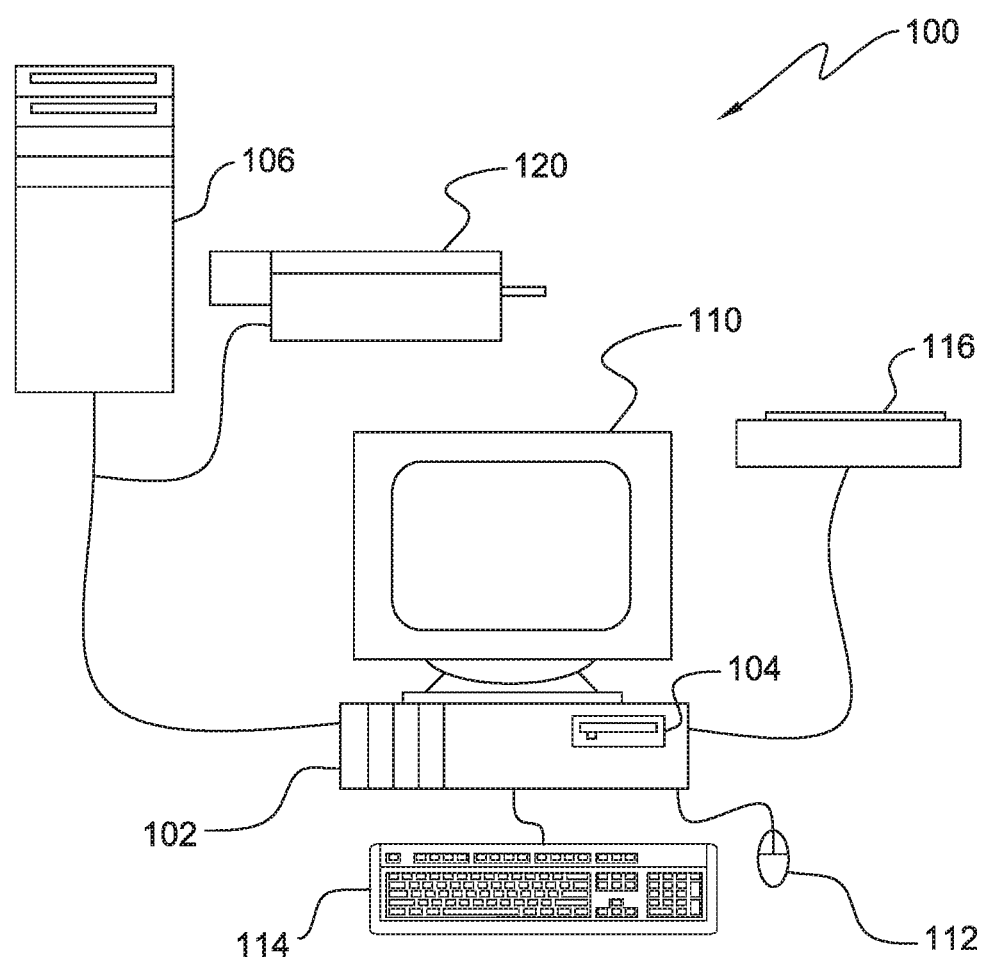
FIG. 9 shows a computing environment that may be used to implement an embodiment of the invention.

The method of the present invention will be generally implemented by a computer executing a sequence of program instructions for carrying out the steps of the method and may be embodied in a computer program product comprising media storing the program instructions. Referring to FIG. 9, a computer system 100 is depicted on which the method of the present invention may be carried out. Processing unit 102, houses a processor, memory and other systems components that implement a general purpose processing system that may execute a computer program product comprising media, for example a floppy disc that may be read by processing unit 102 through floppy drive 104.

The program product may also be stored on hard disk drives within processing unit 102 or may be located on a remote system 106 such as a server, coupled to processing unit 102, via a network interface, such as an ethernet interface. Monitor 110, mouse 112 and keyboard 114 are coupled to processing unit 102, to provide user interaction. Scanner 116 and printer 120 are provided for document input and output. Printer 120, is shown coupled to processing unit 102 via a network connection, but may be coupled directly to the processing unit. Scanner 116 is shown coupled to processing unit 102 directly, but it should be understood that peripherals may be network coupled or direct coupled without affecting the ability of computer system 100 to perform the method of the invention.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of predicting classifications of users of a social network, the method comprising:
    identifying a multitude of users of the social network, wherein in the social network, messages are sent by and among the users, and some of the messages sent by some of the users are re-sent by others of the users;
    obtaining a set of historical data of a defined activity in the social network, the defined activity comprising messages from each user being re-sent by the others of the users;
    separating the multitude of users into a plurality of classes based on a number of times messages sent by each user are re-sent by the others of the users in the social network;
    identifying a multitude of measures as predictors of which one of the classes each of the users is in;
    using the set of historical data to determine an effectiveness of each of the measures as a predictor of which one of the classes each of the users is in; and
    forming a composite predictor model by combining said measures to determine which one of the classes each of the users is in, said composite predictor model used to predict how often users in different classes will have a specified influence in the social network in the future.

2. The method according to claim 1, wherein the identifying a multitude of measures as predictors of which one of the classes each of the users is in includes identifying a multitude of measures as predictors of the level of he defined activity associated with each of the users.

3. The method according to claim 2, wherein the obtaining a set of historical data of a defined activity in the social network includes obtaining a set of historical data of the level of the defined activity associated with each of the users.

4. The method according to claim 3, wherein the using the set of historical data to determine an effectiveness of each of the measures as a predictor of which one of the classes each of the users is in includes using the set of historical data to determine an effectiveness of each of the measures as a predictor of the level of the defined activity associated with each of the users.

5. The method according to claim 1, wherein the forming the composite predictor model includes comparing the performance of each of the measures.

6. The method according to claim 5, wherein the comparing the performance of each of the measures includes comparing the performance of each of the measures versus a logistic regression.

7. The method according to claim 5, wherein the comparing the performance of each of the measures includes comparing the performance of each of the measures versus a logistic regression applied to all the measures.

8. The method according to claim 1, further comprising:
ranking of each of the multitudes measures in an order based on the determined effectiveness of each of the measures; and
forming the composite predictor model by combining said measures in the order of said ranking of the measures, to determine which ones of the multitude of users will have the specified influence in the social network in the future.

9. A system for predicting classifications of users of a social network, the social network having a multitude of users, wherein in the social network, messages are sent by and among the users, and some of the messages sent by some of the users are re-sent by others of the users, the system comprising:
a memory for holding data; and
one or more processing units operatively connected to the memory and configured for:
accessing a set of historical data of a defined activity in the social network, the defined activity comprising messages from each user being re-sent by the others of the users;
separating the multitude of users of the network into a plurality of classes based on a number of times messages sent by each user are re-sent by the others of the users in the social network, and wherein a multitude of measures are identified as predictors of which one of the classes each of the users is in;
using the set of historical data to determine an effectiveness of each of the measures as a predictor of which one of the classes each of the users is in; and
forming a composite predictor model by combining said measures to determine which one of the classes each of the users is in, said composite predictor model used to predict how often users in different classes will have a specified influence in the social network in the future.

10. The system according to claim 9, wherein the identifying a multitude of measures as predictors of which one of the classes each of the users is in includes identifying a multitude of measures as predictors of the level of he defined activity associated with each of the users.

11. The system according to claim 10, wherein the obtaining a set of historical data of a defined activity in the social network includes obtaining a set of historical data of the level of the defined activity associated with each of the users.

12. The system according to claim 11, wherein the using the set of historical data to determine an effectiveness of each of the measures as a predictor of which one of the classes each of the users is in includes using the set of historical data to determine an effectiveness of each of the measures as a predictor of the level of the defined activity associated with each of the users.

13. The system according to claim 9, wherein the one or more processing units are further configured for:
ranking of each of the multitudes measures in an order based on the determined effectiveness of each of the measures; and
forming the composite predictor model by combining said measures in the order of said ranking of the measures, to determine which ones of the multitude of users will have the specified influence in the social network in the future.

14. An article of manufacture comprising:
at least one tangible computer readable hardware medium having computer readable program code logic tangibly embodied therein to predict classifications of users of a social network, the social network having a multitude of users, wherein in the social network, messages are sent by and among the users, and some of the messages sent by some of the users are re-sent by others of the users, said computer readable program code logic, when executing, performing the following:
accessing a set of historical data of a defined activity in the social network, the defined activity comprising messages from each user being re-sent by the others of the users;
separating the multitude of users of the network into a plurality of classes based on a number of times messages sent by each user are re-sent by the others of the users the defined activity in the social network, and wherein a multitude of measures are identified as predictors of which one of the classes each of the users is in;
using the set of historical data to determine an effectiveness of each of the measures as a predictor of which one of the classes each of the users is in; and
forming a composite predictor model by combining said measures to determine which one of the classes each of the users is in, said composite predictor model used to predict how often users in different classes will have a specified influence in the social network in the future.

15. The article of manufacture according to claim 14 wherein the identifying a multitude of measures as predictors of which one of the classes each of the users is in includes identifying a multitude of measures as predictors of the level of he defined activity associated with each of the users.

16. The article of manufacture according to claim 15, wherein the obtaining a set of historical data of a defined activity in the social network includes obtaining a set of historical data of the level of the defined activity associated with each of the users.

17. The article of manufacture according to claim 16, wherein the using the set of historical data to determine an effectiveness of each of the measures as a predictor of which one of the classes each of the users is in includes using the set of historical data to determine an effectiveness of each of the measures as a predictor of the level of the defined activity associated with each of the users.

18. The article of manufacture according to claim 14 wherein the computer readable program code logic, when executing, further performs:
ranking of each of the multitudes measures in an order based on the determined effectiveness of each of the measures; and
forming the composite predictor model by combining said measures in the order of said ranking of the measures, to determine which ones of the multitude of users will have the specified influence in the social network in the future.

* * * * *